K. NOMIYA.
LAWN SPRINKLER.
APPLICATION FILED NOV. 29, 1915.
1,187,373.   Patented June 13, 1916.
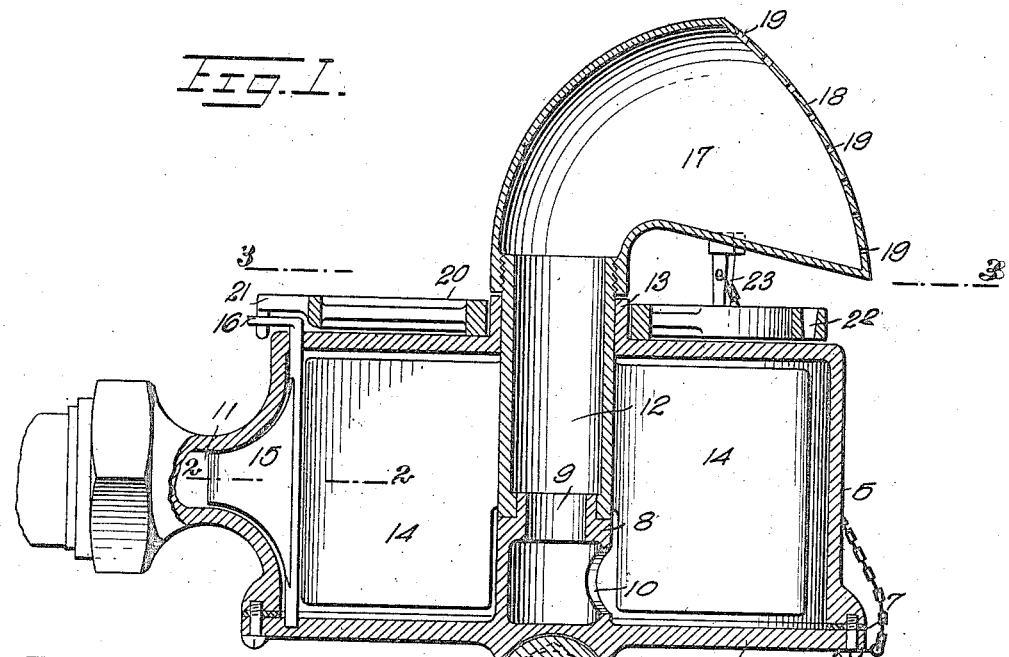
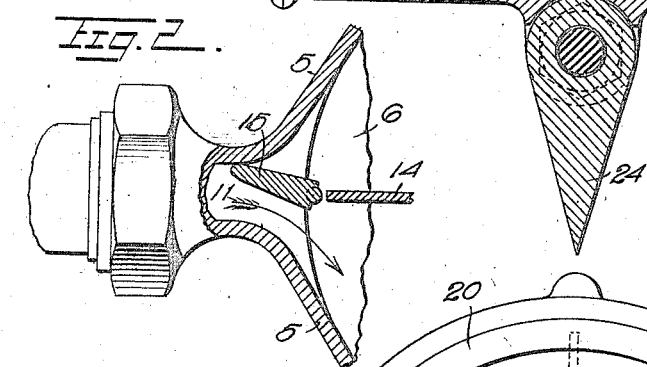
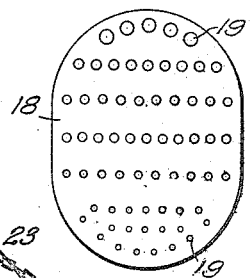
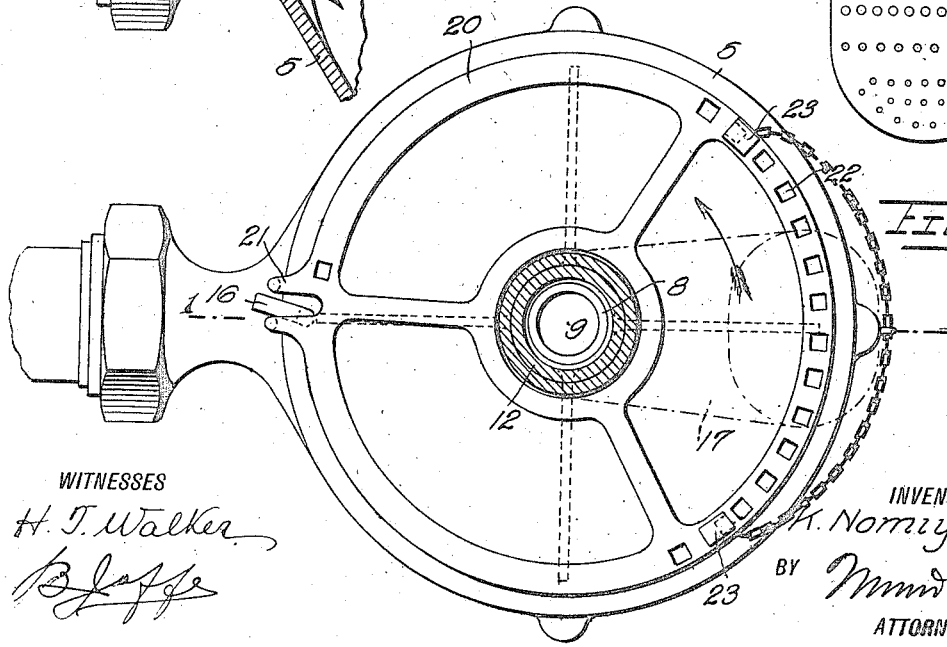
WITNESSES
H. T. Walker
B. Jaffe
INVENTOR
K. Nomiya
BY Munn & Co
ATTORNEYS

UNITED STATES PATENT OFFICE.

KUNISABURO NOMIYA, OF BERKELEY, CALIFORNIA.

LAWN-SPRINKLER.

1,187,373. Specification of Letters Patent. Patented June 13, 1916.

Application filed November 29, 1915. Serial No. 64,004.

*To all whom it may concern:*

Be it known that I, KUNISABURO NOMIYA, a subject of the Mikado of Japan, and a resident of Berkeley, in the county of Alameda and State of California, have invented a new and Improved Lawn-Sprinkler, of whch the following is a full, clear, and exact description.

My invention relates to lawn sprinklers of the revolving type.

An object thereof is to provide a simple and inexpensive lawn sprinkler which may revolve continuously in one direction or which may be caused to revolve forth and back through predetermined angular distances.

A further object of the invention is to provide a lawn sprinkler in which a sprinkling head is so arranged that it will deliver substantially the same amount of water near the sprinkling head as at a distance therefrom.

A still further object of the invention is to provide a lawn sprinkler which can be placed at different inclinations to the ground to be sprinkled.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views.

Figure 1 is a vertical, axial section through my device on line 1—1, Fig. 3; Fig. 2 is a horizontal, fragmentary section on line 2—2, Fig. 1; Fig. 3 is a horizontal section on line 3—3, Fig. 1; and Fig. 4 is an end elevation of the sprinkling head.

Referring to the drawings, 5 is a cylindrical casing having a detachable head 6 at one end thereof. A gasket 7 is interposed between the ends of the casing and the head 6 to prevent leakage therebetween. The head 6 has an axial hollow projection 8 having an axial opening 9 and a lateral opening 10. The casing 5 has also a lateral opening 11 constituting the water inlet to the casing, which has means for securing it to a garden hose, and which is preferably diametrically opposite to the opening 10 of the projection 8. The projection 8 is reduced externally at the end thereof to form a bearing for the end of a sleeve 12, one end of which projects through the upper end of the casing 5. The lower end of the casing is formed by the head 6. The upper end of the casing has an outer collar 13 surrounding the sleeve 12 to increase the bearing surface for the sleeve in the casing 5. Said sleeve 12 has blades or vanes 14 within the casing 5.

The water coming through the inlet 11 of the casing is directed against the vanes through the medium of a gate valve 15 mounted to swing in the casing at the opening 11. The stem of the gate valve projects through the top of the casing where a crank 16 is provided so that the gate can be placed against one or the other side of the inlet 11, thereby causing the inflowing water to deviate from its radial direction to one or the other side and, in consequence, cause a corresponding rotation of the sleeve 12.

A horn-shaped sprinkling head 17 is threaded on to the projecting end of the sleeve 12 so as to participate in the movement of the sleeve. The delivery end 18 of the sprinkling head is convex, the upper portion of said end 18 being at a shorter radial distance from its axis of rotation than the lower portion. The openings or perforations 19 in said end 18 are larger at the upper portion than at the lower portion, the size of said openings decreasing gradually from the upper to the lower portion of the delivery end 18. Due to the curvature of the delivery end and to the various sizes of the openings, substantially the same quantity of water is delivered near the sprinkler and at a distance therefrom.

To oscillate the sprinkling head within predetermined angular distances in lieu of continuous rotation thereof, a valve-operating member 20 is mounted to rotate on the collar 13 at the top of the casing. The valve-operating member has an extension 21 for engaging the crank 16 of the gate valve. It has also a plurality of openings 22 each of which may be engaged by a pin 23, two of said pins being used, one to each side of the head. As the water enters the casing in the direction shown by the arrow in Fig. 2 it will cause the head to rotate in the direction shown by the arrow in Fig. 3 until the head comes into engagement with the pin 23 seen in Fig. 1, when the member 20 will be caused to swing on the collar and move the gate valve 15 so as to switch the flow to the other side of the casing, thereby reversing the rotary movement of the sprinkling head, which will then rotate in a direction opposite to the arrow indicated in Fig. 3 until it comes in contact with the corresponding pin 23, thereby causing a displacement of the member 20, which will operate the valve and change the direction of flow of the water. Thus, it can be seen that by placing the pins 23 at any desired distance from each other, the head can be oscillated through any predetermined distances. When the pins are not used the head will rotate continuously in one or the other direction, according to the position of the valve 15.

To maintain the device secure while sprinkling, and at the same time to permit the head to be placed at an angle to the ground to be sprinkled, the base of the device is provided with a sharp anchoring member or tongue 24 which is pivotally connected to the head 6 so that the casing can swing on the tongue when the same is secured.

I claim:

1. In a device of the class described, a sprinkling head mounted to rotate, means for rotating the head operable by the water to be discharged through the head, and means controlling the flow to the means for rotating the head operable by the movement of the sprinkler head whereby said sprinkling head may be caused to oscillate.

2. In a device of the class described, a sprinkling head mounted to rotate, means for rotating the head operable by the water to be discharged through the sprinkling head, means controlling the direction of flow to said means for rotating the head, and means for actuating the means for changing the flow and operable by the head, whereby said head is oscillated.

3. In a device of the class described, a sprinkling head mounted to rotate, means for supplying water to the head, means for rotating the head interposed between the head and the supply and adapted to be actuated by the flow of the water from the supply to the head, means for varying the direction of flow positioned at the supply whereby the direction of rotation of said head is controlled, and means adapted to be engaged by said head at various predetermined displacements thereof for operating said means for varying the direction of flow, whereby said head is caused to oscillate.

4. In a device of the class described, a casing having a peripheral inlet, a gate valve for diverting the flow through the inlet to one side of the radial direction, a sprinkling head rotatably mounted in the casing and forming the outlet from the casing, vanes in said casing rigid with the head, said vanes being adapted to be actuated by the water flowing into the casing, and means for shifting the gate operable by the sprinkler head.

5. In a device of the class described, a casing having a peripheral inlet, a gate valve at the inlet for diverting flow to one side from the radial direction of the casing, a sprinkling head rotatably mounted in the axis of the casing and forming the outlet from the casing, vanes rotatably mounted in said casing and rigidly connected with the head, said vanes adapted to be actuated by the diverting flow from the inlet to the outlet caused by the valve, and means for operating the valve, including means adapted to be engaged by the rotary movement of the head, whereby the direction of flow is shifted from one side to the other side of the radial direction, thereby reversing the rotation of the head.

6. In a device of the class described, a casing having a peripheral inlet, a gate valve at the inlet for diverting the flow from the inlet to one side from the radial direction of the casing, a sleeve rotatably mounted in said casing and projecting out therefrom, a sprinkling head secured to the projecting head of said sleeve, vanes within the casing and rigid with said sleeve, said vanes adapted to be actuated by the diverted flow from the inlet, a member co-axial with the sleeve and rotatably mounted on the axis for operating the valve, the engagement of said valve with said member limiting the rotary movement thereof, and means adjustable on said member and engageable by the rotary movement of the head whereby the valve is operated to change the direction of flow for changing the direction of rotation of the vanes.

7. In a device of the class described, a cylindrical casing having a peripheral inlet, a gate valve at the inlet for diverting the flow to one side of the casing's radial direction, a tubular, axial projection at one end of said casing, said projection having a lateral opening forming the outlet from the casing, a sleeve rotatably mounted on said projection and having one end thereof projecting through the other end of the casing, a sprinkling head connected to said sleeve to participate in the rotary movement thereof, vanes in said casing in rigid connection with said sleeve and adapted to be actuated by the flow diverted by the valve, a crank associated with the gate valve for operating the same, a member rotatably mounted about the sleeve and engaging said crank, said member having a plurality of openings, and pins for engaging any of said openings and adapted to lie in the path of the rotary movement of the head; whereby said member is caused to operate the valve by a predetermined rotary displacement of said head and whereby the direction of flow to the vanes is changed.

8. In a device of the class described, a casing having a peripheral inlet, a gate valve for diverting the flow from the inlet to one side of the casing's radial direction, a sprinkling head rotatably mounted in the casing and forming an inlet from the casing, vanes in said casing rigid with the head and adapted to be actuated by the diverted flow of the water into the casing, and means for operating the gate lying in the path of the head's rotary movement whereby the gate is caused to change the direction of flow from one side to the other side of the casing's radial direction, thereby reversing the rotation of the head.

9. In a device of the class described, a casing having a peripheral inlet, a gate valve for diverting the flow from the inlet to one side of the casing's radial direction, a sprinkling head rotatably mounted in the casing to form the outlet therefrom, vanes in said casing rigid with the head and adapted to be actuated by the diverted flow of water from the inlet to the casing, means for operating the gate valve whereby the flow is changed from one side to the other side of the casing's radial direction, and means adjustable on said operating means adapted to lie in the path of the rotary movement of the head whereby said valve operating means are actuated.

In testimony whereof I have signed my name to this specification in the presence of two subscribing witnesses.

KUNISABURO NOMIYA.

Witnesses:
 FRANK M. MAY,
 H. I. STERN.